TELEVISION AND LIKE APPARATUS

Filed April 22, 1950

Inventor
Patrick R. J. Court
By
Emery, Holcombe & Blair
Attorney

Patented May 15, 1951 2,553,360

UNITED STATES PATENT OFFICE 2,553,360

TELEVISION AND LIKE APPARATUS

Patrick R. J. Court, Cambridge, England, assignor to Pye Limited, Cambridge, England, a British company Application April 22, 1950, Serial No. 157,583
In Great Britain April 29, 1949

10 Claims. (Cl. 315—27)

The present invention relates to television and like apparatus and is particularly concerned with line scanning circuits of the electro-magnetic type including an efficiency or damping diode valve.

The present invention will now be described with reference to the accompanying drawings in which.

Figure 3:
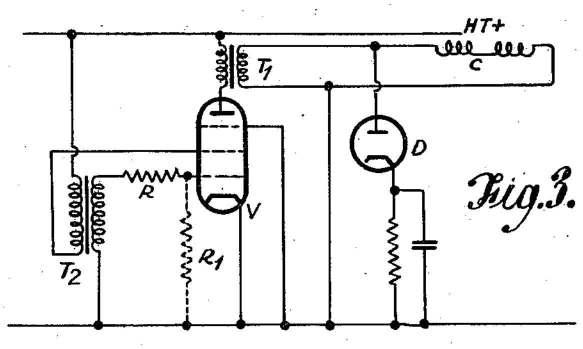
Fig. 3 is a circuit diagram of one embodiment in accordance with the present invention.

Fig. 4 comprises four diagrams showing voltage/time relationships at four points in the circuit of Fig. 3.

Figures 4A, 4B, 4C, 4D, 5:
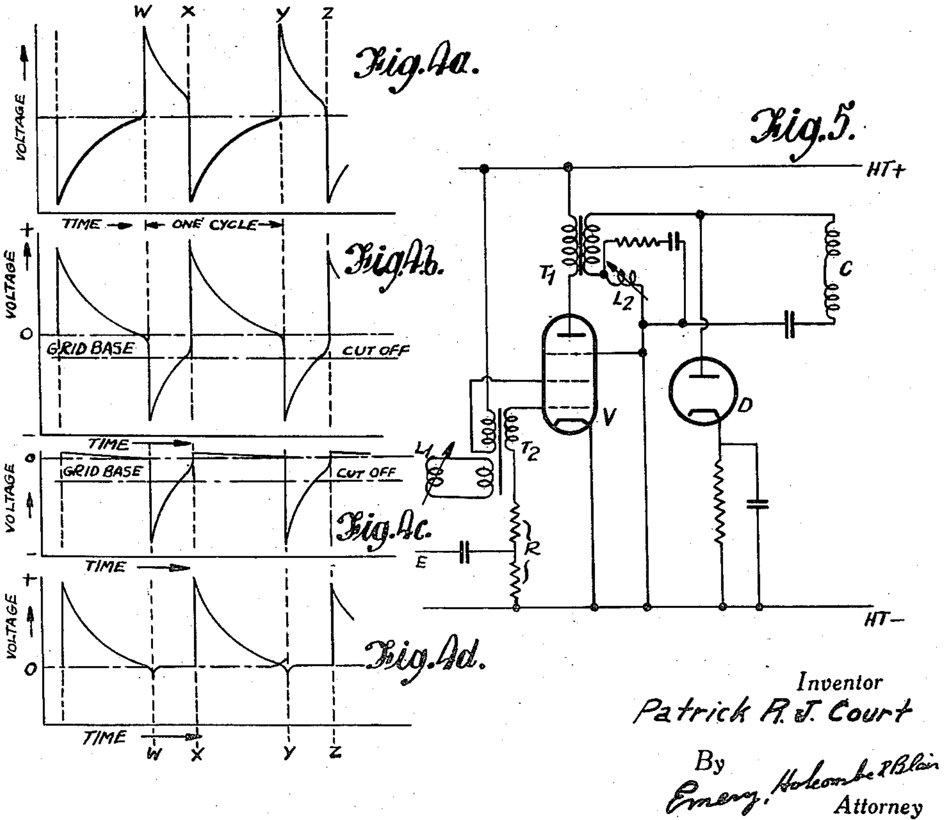

Fig. 5 is a circuit diagram of a modification.

Figure 1:
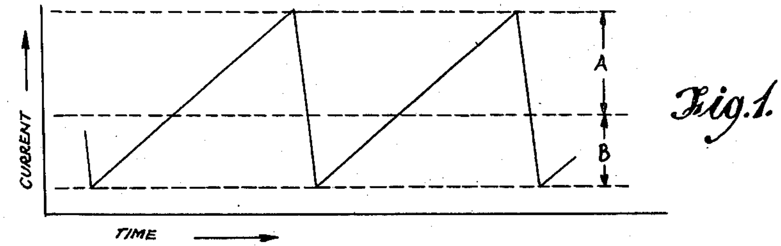
Fig. 1 is a diagram showing the proportion of the scanning trace supplied by the output valve and by the efficiency diode.

When an energy recovery circuit employing an efficiency or damping diode is used in conjunction with an electro-magnetic type of line scanning circuit (as is usually necessary when applying A. C./D. C. technique to television receivers and when deriving E. H. T. from the flyback voltage), it is generally desirable to arrange for the output valve to be "cut off" during the period when the efficiency diode is operating. The efficiency diode converts the energy stored in the inductance of the deflector coils after the trace period into useful deflection power. The proportion of the actual trace furnished by the diode is a function of the losses of the system, and is usually somewhere between 20% and 50%. When the diode portion of the trace is complete, the output valve is arranged to commence conducting and supply the remainder of the trace current. See Fig. 1 in which A represents the portion of the trace supplied by the output valve and B the portion of the trace supplied by the efficiency diode.

One of the problems associated with the design of self-oscillating types of output stage is to arrange for the valve to be conducting for the ideal percentage of the total trace time.

Further problems encountered in the design of such power oscillators are:

1. Interdependence of controls, i. e., amplitude control affecting frequency and vice versa.

2. Obtaining satisfactory linearity.

Figure 2:
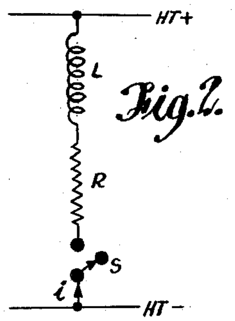
Fig. 2 is an equivalent circuit diagram of the basic circuit of a self-oscillating output stage.

In general the self-oscillating types of output stage is arranged to constitute in effect a switching device as indicated diagrammatically in the basic circuit of Fig. 2. In this figure L represents the inductance of the deflector coils reflected back via the output transformer. R represents the total circuit resistance, including the internal resistance of the valve. S represents the valve acting as a switch. When S is closed the current through L rises exponentially according to the law:

$$i=I\left(1-e^{\frac{-Rt}{L}}\right)$$

In order that the current shall be substantially linear to a statisfactory degree the time constant $$\frac{L}{R}$$

must be long compared with the time taken by 1 cycle (approx. 100 $\mu$s.). In practice this has meant that the valve employed must be of some low impedance type, unless compensation is employed, which severely limits the choice of valves which may be used in such a circuit.

The present invention relates to a self-oscillating line scan output stage which overcomes this and the other design problems previously mentioned. The basic circuit in accordance with the invention is shown in Fig. 3.

The oscillating circuit is between the screen-grid, acting as the oscillatory anode, and the control-grid of the valve V.

The time constant of the transformer T2 (looking into the primary) is approximately one half of one complete cycle $$\left(\frac{1}{20{,}000}\text{ sec.}\right)$$

The transformer ratio is approximately 1:1.

The voltage waveforms encountered in the circuit are shown in Fig. 4, in which:

(*a*) represents the voltage of the screen grid across the primary of the transformer T2;

(*b*) represents the voltage across the secondary of the transformer T2;

(*c*) represents the grid voltage; and (*d*) represents the voltage across the resistance R i. e. (*b*)—(*c*).

For an explanation of the operation of the circuit, consider the waveforms shown at the point where the grid approaches the potential where the valve commences to conduct (point X). The screen-grid current will cause the screen-grid to go more negative. The voltage across the transformer secondary will consequently become more positive and so on. Thus the valve will rapidly reach an unstable limiting condition with the screen-grid at a low potential, and the voltage across the transformer secondary highly positive. The voltage developed across the primary will be proportional to the rate of change of screen grid current, and to the inductance in the circuit.

The grid will endeavour to follow the positive excursion of the secondary of T2, but due to grid current flow, will have a low impedance represented by R′. R and R′ form a potentiometer where R»R′ so that the grid voltage will remain roughly constant at slightly above zero volts during the positive excursion of the transformer secondary.

When the current through the valve, and hence through the primary of the transformer T2 reaches the maximum value, the rate of change of current becomes zero, and the voltages across the transformer windings commence to decay at a rate governed by the transformer time constant. The screen-grid voltages will commence to rise and the voltage across the secondary will commence to fall. The grid voltages will also fall, only very much more slowly, due to the potentiometer effect of R—R′. Finally a condition is reached when the grid falls below zero volts and the grid impedance R′ becomes very high. The valve rapidly reaches another unstable limiting condition, with the valve cut off, the screen-grid very positive, and the voltage across the secondary of T2 very negative (point Y). The grid is able to follow the negative excursion of the transformer secondary due to the fact that it now presents a high impedance and there will be no potentiometer effect.

In the absence of a current change, the potentials developed across the windings of the transformer T2 commence to collapse, again at a rate governed by the time constant of the transformer T2. The transformer secondary potential (which is now the same as the grid potential) commences to rise, and the screen-grid potential commences to fall. The point is reached where the valve starts to conduct and the operation repeats itself (point Z).

It will be seen that the valve is conducting for a longer period than which it is cut off and the reason for this will be made clear from a study of Figs. 4(*b*) and 4(*c*) of the waveform diagrams. While the waveform across the secondary of the transformer T2 is symmetrical about the zero volt line, the grid base of the valve V is not, as it extends from zero volts to some point negative, which is, of course, "cut off." Thus the time taken for the voltage to fall from maximum positive to zero volts (X to Y) is longer than the time taken to rise from maximum negative to the point where conduction commences i. e. "cut-off" (W to X). The complete cycle is from W to Y, and W to X represents about 40% of the complete cycle (including say 10% flyback) and X to Y represents about 60%.

Thus, allowing for 10% flyback time, the valve V is conducting for about 70% of the trace time, and cut off for 30% of the trace time, which approaches the desired state of affairs. In practice the relative time durations may be adjusted within small limits by applying bias to the valve, by altering the ratio of T2, and by adjusting the value of R.

By a suitable adjustment of these factors the valve conduction time may be made exactly correct to suit the losses of a particular deflection system, and a satisfactory balance made between the portion of the trace supplied by the diode D, and the portion supplied by the output valve V. Thus, the invention overcomes the first problem mentioned.

Control of frequency may be effected by varying the inductance of the windings of the transformer T2. This may be achieved for example:

1. By varying the gap in the iron circuit of the transformer T2; or

2. By arranging a variable inductance L1 in parallel with one of the windings of the transformer T2, or across a separate winding arranged on the transformer T2 as shown in Fig. 5. The variable inductance may be a single wavewound coil with an adjustable dust-iron core.

The amplitude of scan is preferably varied by means of a variable inductance L2 in series with the deflector coils C arranged as shown in Fig. 5. Some damping may be necessary across this inductance as shown in Fig. 5. The two variable inductances may be made of identical construction.

As the oscillating circuit is between screen-grid and control-grid, variation of amplitude in the anode circuit has no appreciable effect upon the frequency and vice versa. Thus the second problem of design is overcome.

It will be seen from an inspection of the waveform diagrams that during the conduction time of the valve V the screen-grid potential is rising. This has a profound effect upon the non-linear rise of current which would occur if the current were controlled only by the exponential law mentioned in the introduction.

This compensating, linearising effect of the screen-grid waveform upon the anode current permits an ordinary, medium impedance output pentode to be employed.

Further irregularities in the scanning waveform are smoothed out by the action of the efficiency diode D.

The resultant sawtooth current delivered to the deflector coils is linear within acceptable limits, so that the third problem of design is catered for by the invention.

Synchronisation is effected by feeding negative-going synchronising pulses into the grid circuit at E as shown in Fig. 5. These initiate the negative grid excursion at points W and Y in Fig. 4(*c*).

It is found that this type of scanning circuit may be about 20% more efficient than an ordinary sawtooth driven output stage, using identical power valves, due to the fact that the grid voltage is slightly positive during the entire conduction time of the valve. The increased efficiency makes the circuit particularly suitable for an A. C./D. C. television receiver where the H. T. voltage may be limited.

Use may be made of the bias voltage developed by the efficiency diode, as a "boost" voltage which may be added to the anode supply voltage or to both anode and screen-grid supply voltage by using any of the known methods.

E. H. T. supply may be derived from the flyback voltage in the scanning output transformer by any of the known methods.

Whilst the arrangement described has been designed primarily for use with a medium impedance output valve, it will be understood that an output valve of the low impedance type may be used. Without correction, even a low impedance type of valve, acting as a switch, will tend to produce a non-linear current sawtooth in an inductive load, though less so when using an ordinary pentode. The waveform at the screen grid will correct for that non-linearity.

I claim:

1. Line scanning circuit for television apparatus, comprising an electronic valve comprising an evacuated envelope containing a cathode, an anode, and at least two grids arranged between the cathode and anode, the second grid being further away from the cathode than the first grid, a source of high voltage, a feedback transformer having its primary winding connected between the second grid and the positive terminal of the high voltage source and its secondary winding connected between the first grid and the cathode, a resistance in series with said secondary winding, an output transformer having its primary winding connected between the anode of the valve and the positive terminal of the high voltage source, line deflecting coils connected across the secondary winding of said output transformer, and a diode shunted across the secondary winding of said output transformer.

2. Circuit as claimed in claim 1, wherein a variable inductance is connected in series with the secondary winding of the output transformer and the deflector coils.

3. Circuit as claimed in claim 2, wherein said variable inductance is shunted by damping means.

4. Circuit as claimed in claim 1, wherein a variable inductance is shunted across one of the windings of the feedback transformer whereby the inductance of the winding may be varied to adjust the frequency of operation of the circuit.

5. Circuit as claimed in claim 1, comprising a third winding on the feedback transformer, and a variable inductance shunting said third winding.

6. Circuit as claimed in claim 1, wherein the valve has a third grid arranged between the second grid and the anode and connected to point of low potential.

7. Line scanning circuit for television apparatus, comprising an electronic valve comprising an evacuated envelope containing a cathode, an anode, and at least two grids arranged between the cathode and anode, the second grid being further away from the cathode than the first grid, a source of high voltage, a feedback transformer having its primary winding connected between the second grid and the positive terminal of the high voltage source and its secondary winding connected between the first grid and the cathode, a resistance in series with said secondary winding, an output transformer having its primary winding connected between the anode of the valve and the positive terminal of the high voltage source, line deflecting coils connected across the secondary winding of said output transformer, a diode shunted across the secondary winding of said output transformer, a variable inductance connected in series with the secondary winding of said output transformer and the deflector coils, and a variable inductance connected in parallel with one of the windings of the feedback transformer.

8. Line scanning circuit for television apparatus, comprising an electronic valve comprising an evacuated envelope containing a cathode, an anode, and at least two grids arranged between the cathode and anode, the second grid being further away from the cathode than the first grid, a source of high voltage, a feedback transformer having its primary winding connected between the second grid and the positive terminal of the high voltage source and its secondary winding connected between the first grid and the cathode, a resistance in series with said secondary winding, an output transformer having its primary winding connected between the anode of the valve and the positive terminal of the high voltage source, line deflecting coils connected across the secondary winding of said output transformer, a diode shunted across the secondary winding of said output transformer, a variable inductance connected in series with the secondary winding of said output transformer and the deflector coils, a third winding on the feedback transformer, and a variable inductance shunting said third winding.

9. Line scanning circuit for television apparatus comprising an electronic valve comprising an evacuated envelope containing a cathode, an anode, and three grids arranged between the cathode and anode, the second grid being further away from the cathode than the first grid and the third grid being disposed between the second grid and the anode, a source of high voltage, a feedback transformer having its primary winding connected between the second grid and the positive terminal of the high voltage source and its secondary winding connected between the first grid and the cathode, a resistance in series with said secondary winding, means connecting said third grid to a point of low potential, an output transformer having its primary winding connected between the anode of the valve and the positive terminal of the high voltage supply source, line deflecting coils connected across the secondary winding of said output transformer, a diode shunted across the secondary winding of said output transformer, a variable inductance connected in series with the secondary winding of said output transformer and the deflector coils, damping means shunting said inductance, and means for varying the inductance of the windings of the feedback transformer.

10. Line scanning circuit for television apparatus, comprising an electronic valve comprising an evacuated envelope containing a cathode, an anode and at least two grids arranged between the cathode and anode, the second grid being further away from the cathode than the first grid, a source of high voltage, a feedback transformer having its primary winding connected between the second grid and the positive terminal of the high voltage source and its secondary winding connected between the first grid and the cathode, a resistance in series with said secondary winding, line deflecting coils, an output circuit coupling the anode of the valve to the deflecting coils, and an efficiency diode connected in said output circuit.

PATRICK R. J. COURT.

REFERENCES CITED

The following references are of record in the file of this patent:

UNITED STATES PATENTS

| Number | Name | Date |
|---|---|---|
| 2,438,359 | Clapp | Mar. 23, 1948 |
| 2,473,983 | Wolf | June 21, 1949 |
| 2,482,150 | Bocciarelli | Sept. 20, 1949 |
| 2,495,696 | Cawein | Jan. 31, 1950 |
| 2,517,715 | Rogers | Aug. 8, 1950 |